United States Patent [19]

Zeilinger et al.

[11] Patent Number: 4,651,630

[45] Date of Patent: Mar. 24, 1987

[54] THERMALLY INSULATING PISTONS FOR INTERNAL COMBUSTION ENGINES AND METHOD FOR THE MANUFACTURE THEREOF

[75] Inventors: Hans Zeilinger, Puchheim-Bahnhof, Austria; Edwin Erben, Munich, Fed. Rep. of Germany

[73] Assignee: M.A.N. Maschinenfabrik Augsburg-Nurnberg Aktiengesellschaft, Munich, Fed. Rep. of Germany

[21] Appl. No.: 693,285

[22] Filed: Jan. 22, 1985

[30] Foreign Application Priority Data

Feb. 7, 1984 [DE] Fed. Rep. of Germany ....... 3404121

[51] Int. Cl.[4] .................................................. F16J 1/04

[52] U.S. Cl. ................................ 92/212; 29/156.5 R; 92/224; 123/193 P; 164/98; 228/176

[58] Field of Search ......................... 92/212, 222, 224; 29/156.5 R, DIG. 5, DIG. 31, 469.5; 123/193 P; 164/98, 103; 228/193, 176, 263.12

[56] References Cited

U.S. PATENT DOCUMENTS

| | | | |
|---|---|---|---|
| 2,297,460 | 9/1942 | Dietrich | 123/193 P |
| 3,977,459 | 8/1976 | Bonitz | 164/98 |
| 4,152,816 | 5/1979 | Ewing et al. | 228/193 X |
| 4,334,507 | 6/1982 | Kohnert et al. | 29/156.5 R |
| 4,404,262 | 9/1983 | Watmough | 164/98 |
| 4,492,737 | 1/1985 | Conolly | 416/241 B |
| 4,530,884 | 7/1985 | Erickson et al. | 123/193 P |
| 4,538,562 | 9/1985 | Matsui et al. | 92/212 X |
| 4,546,048 | 10/1985 | Guenther | 164/98 X |

*Primary Examiner*—Edward K. Look
*Attorney, Agent, or Firm*—Scully, Scott, Murphy & Presser

[57] ABSTRACT

A thermally insulating piston for internal combustion engines is provided on the piston crown or in its dished combustion space portion with a thermally insulating liner which on the side thereof facing the combustion space consists entirely of a ceramic material, and which on the side thereof facing the piston crown or its dished combustion space portion has a metallic or metal-ceramic material fused with the piston metal.

9 Claims, No Drawings

THERMALLY INSULATING PISTONS FOR INTERNAL COMBUSTION ENGINES AND METHOD FOR THE MANUFACTURE THEREOF

BACKGROUND OF THE INVENTION

1. Field of the Invention

The present invention relates to thermally insulating pistons for internal combustion engines, and to a method of producing such thermally insulating pistons.

The worldwide increased costs of fuels utilized for internal combustion engines has led to intensive efforts in obtaining improved fuel savings or economy. One of the possibilities in obtaining fuel savings through thermally insulating the combustion chamber, in effect, the cylinder walls, the cylinder head;, and especially, however, the piston crown, through which there escapes a substantial portion of the heat.

2. Discussion of the Prior Art

There are presently known some ceramic materials possessing a thermal conductivity λ of less than 2 or 3 W/m °K, which would render them ideal as insulators for piston crowns; nevertheless, such piston crowns or the dished combustion chamber portions of the pistons which are insulated with these ceramic material have hitherto remained unknown. The reason for this is attributed to the difficulties connected in the depositing of ceramic materials on the metallic piston. Thus, heretofore been impossible to form a bound between ceramic components and the piston material; for instance, Silumin (cast aluminum alloy with 10 to 25% Si) preferred for this purpose, which possesses the necessary mechanical strength under the temperatures or temperature differences reigning in the internal combustion engine.

SUMMARY OF THE INVENTION

Accordingly, it is a primary object of the present invention to provide a piston for internal combustion engines, the crown or dished combustion chamber portion of which is equipped with a fixedly adherant thermally insulating liner or coating of a ceramic material.

It has now been ascertained that, in a surprising manner, a ceramic member can without difficulty and with considerable strength be bonded to the usual metallic piston materials when the ceramic member has a surface of a metallic or metal-ceramic material on the side thereof which is to be bonded to the piston material. Upon the pouring of molten piston metal onto such a surface, a bonding strength which has heretofore been unknown can be achieved between the thermally insulating ceramic material and the piston material.

A more specific object of the present invention is to provide a piston for internal combustion engines which distinguishes itself in that the piston crown or its dished combustion chamber portion is provided with a thermally insulating coating or liner which, on the side thereof facing the combustion chamber, consists entirely of ceramic material, and which on the side thereof facing the piston crown or its dished combustion chamber portion, consists of a metallic or metal-ceramic material fused together with the piston metal. As a result, the side of the coating or liner facing the piston crown or its dished combustion chamber portion, possesses a bond securely fused with the piston metal.

Preferably, the ceramic material of the liner has a thermal conductivity λ of less than 2 or 3 W/m °K. in order to achieve an especially effective thermal insulation. Ceramic materials which are preferably employed are $ZrSiO_4$, aluminum titanate, silicon nitride, the synthetic mixed oxide Al-Si having the formula $3Al_2O_3$.-$2SiO_2$ which is known as "Mullit", and a partially modified $ZrO_2$, known as partial stabilized zircon oxide (PSZ), and includes CaO and/or MgO as stabilizers.

The metallic components of the metal ceramic material of the thermally insulating liner preferably consists of or contains iron or iron alloys, whereas as the piston material there is advantageously employed cast Al alloys. Coming into consideration for this purpose is the above-mentioned Silumin; however, other cast Al alloys can also be used. Such other cast Al alloys can be; for instance, eutectic Al-Si alloys containing 11 to 13% Si and lesser additions of Cu, Ni and Mg; hypereutectic Al-Si alloys containing about 17 to 25% Si and lesser additions of Cu, Ni and Mg; and aluminum-copper alloys Al Cu 4 with Ni and Mg additives.

The piston pursuant the present invention, which incorporates a thermally insulating liner or coating on the piston crown or on its dished combustion chamber portion, can be produced as follows:

(a) a member of sheet-like configuration is provided as a thermally insulating liner, (i) the member has its external configuration correlated with the shape of the piston crown or its dished combustion chamber portion, (ii) the member, on the side thereof facing the combustion space or chamber of the internal combustion engine, consists of one or several layers of a completely ceramic material, and (iii) the member, on the side thereof facing the piston crown or its dished combustion chamber portion supports one or several layers of metallic or metal-ceramic materials, is hot-isostatically compressed, and thereafter (b) the molten piston metal is poured onto the resultant compacted member.

This pouring is effected in a manner wherein the compacted member is inserted into the piston mold and cast in conjunction with the piston material.

DETAILED DESCRIPTION OF EXEMPLARY EMBODIMENTS

Under the term "sheet-like member" there is to be understood that this represents a structure whose length and width are a multiple of the size of its depth, such that the structure is generally comparable with that of a mat or carpet. In the preferred utilization of iron or iron alloy as the metallic or metal-ceramic component of the hot isostatic pressed laminate, and a cast Al-alloy constituting the piston material, there are formed intermetallic Fe-Al compounds analogous to the Al-Fin process disclosed in U.S. Pat. No. 2,455,457 during the pouring of the molten piston metal onto the compacted member with the compounds producing a particularly strong mechanical bond between the piston metal and the thermally insulating liner. However, even with the employment of other kinds of piston metals and metal-ceramic materials, will there be attained a bonding strength between the piston and the ceramic liner which, in every instant, is superior to that of the heretofore obtainable bonding strengths.

The hot-isostatic pressing of the porous laminate is generally carried out at temperatures of about 1000° to 1450° C., preferably at about 1200° to 1350° C., and especially at 1300° C. The pressures which are employed in the process usually lie within the range from about 1000 to 1500 bar, preferably within the range from about 1200 to 1300 bar.

The invention is now more closely elucidated on the basis of the following examples:

EXAMPLE 1

A dished combustion chamber insert of $ZrO_2$ was provided internally thereof with a suitable mandrel. Thereafter, through the intermediary of a molybdenum capsule, carbonyl iron powder was applied on the exterior. The test specimen, prepared and encapsulated in this manner, was then introduced into a hot-isostatic press. The HIP process itself was carried out at temperatures of between 1200° and 1300° C., at pressures of between 1000 and 1500 bar, and the pressing time consisted of 1 to 2 hours. The composite, dished combustion space or chamber portion produced in this manner was then cast into Silumin and evidenced an excellent degree of adhesion, whereby this bonding strength corresponded to the strength of the piston material.

EXAMPLE 2

A preformed dished combustion space or chamber insert of $ZrO_2$ was internally fitted with a mandrel. Thereafter through the intermediary of a molybdenum capsule, there was applied a blend of carbonyl iron powder and $ZrO_2$ powder, with a carbonyl iron powder content of 10 to 90%. The sample was then introduced into the hot-isostatic press and compressed as in Example 1. Also this dished combustion space insert was cast into Silumin and evidenced an excellent bonding strength comparable to the strength of the piston material.

What is claimed is:

1. In a thermally insulating piston for the combustion space of internal combustion engines; the improvement comprising: the piston crown or the dished combustion space-facing portion of the piston having a single thermally insulating liner imposed thereon, said liner being constituted of a composite material having one side thereof facing the combustion space consisting entirely of a ceramic material, and the other side of the liner facing the piston crown or its dished combustion space-facing portion consisting of a metallic or metal-ceramic material which is hot-isostatically pressed with said ceramic material so as to be intimately bonded thereto to provide said composite material, and which liner has the metallic or metal-ceramic side thereof directly fused to the piston material.

2. Piston as claimed in claim 1, wherein the ceramic liner material has a thermal conductivity $\lambda$ of less than 2 to 3 W/m°K.

3. Piston as claimed in claim 2, wherein the ceramic material is PSZ, Mullit, $ZrSiO_4$, aluminum titanate or silicon nitride.

4. Piston as claimed in claim 1, wherein the metallic component of the metal-ceramic material of the liner comprises iron.

5. Piston as claimed in claim 1, wherein the piston material is an alloyed or unalloyed cast Al-alloy or gray cast iron.

6. Piston as claimed in claim 5, wherein the cast Al alloy is selected from the group consisting of Silumin, Al Si 12 Cu Mg Ni, Al Si 18 Cu Mg Ni, Al Si 25 Cu Mg Ni or Al Cu 4 Ni Mg.

7. In a method for the manufacturing of a thermally insulating piston for internal combustion engines; the improvement comprising:

(a) providing a member of sheet-like configuration as a thermally insulating liner for predetermined surface portions of said piston;

(i) conforming the external configuration of the member to the shape of the piston crown or its dished combustion space-facing portion;

(ii) providing on one side of the member adapted to face the combustion space of the internal combustion engine with at least one layer of a completely ceramic material; and (iii) providing the opposite side of the member adapted to contact the piston crown or its dished combustion space-facing portion with at least one layer of metallic or metal-ceramic material; hot-isostatically pressing said composite member so as to intimately bond said ceramic material and said metallic or metal-ceramic material so as to constitute a composite material member; and (b) subsequently pouring the molten piston metal onto the resultant compacted member to directly fuse the metallic or metal-ceramic side of said composite material member to said piston metal.

8. Method as claimed in claim 7, wherein the hot-isostatic pressing process is effected at a pressure of about 1000 to 1500 bar, and at a temperature of about 1000° to 1450° C.

9. Method as claimed in claim 8, wherein the pressure is about 1200 to 1300 bar, and the temperature about 1200° to 1350° C.

* * * * *